United States Patent
Scheifele

(10) Patent No.: US 6,358,454 B1
(45) Date of Patent: *Mar. 19, 2002

(54) PROCESS FOR PRODUCING A MULTI-CHAMBER PACKAGING TUBE

(75) Inventor: Fredy Scheifele, Hinwil (CH)

(73) Assignee: KMK Lizence Ltd., Port-Louis (MU)

( * ) Notice: Subject to any disclaimer, the term of this patent is extended or adjusted under 35 U.S.C. 154(b) by 0 days.

This patent is subject to a terminal disclaimer.

(21) Appl. No.: 09/306,546

(22) Filed: May 6, 1999

(30) Foreign Application Priority Data

May 7, 1998 (CH) .............................. 1028/98

(51) Int. Cl.[7] .................. B29C 65/00; B29C 43/18; B29C 45/14; B65D 35/22
(52) U.S. Cl. ................ 264/249; 264/250; 264/259; 264/263; 264/277; 264/DIG. 41; 156/69
(58) Field of Search ................ 264/248, 249, 264/250, 253, 263, 277, DIG. 41; 156/69

(56) References Cited

U.S. PATENT DOCUMENTS

| | | | | |
|---|---|---|---|---|
| 2,777,164 A | * | 1/1957 | Strahm | 425/577 |
| 3,290,422 A | * | 12/1966 | Michel | 264/259 |
| 3,788,520 A | * | 1/1974 | Dukess | 222/94 |
| 4,352,775 A | * | 10/1982 | Magerle | 264/500 |
| 5,219,373 A | * | 6/1993 | Hatakeyama et al. | 29/458 |
| 5,782,384 A | * | 7/1998 | Mustafa et al. | 222/94 |
| 5,788,794 A | * | 8/1998 | Valyi | 156/245 |
| 5,849,241 A | * | 12/1998 | Connan | 264/529 |
| 5,858,153 A | * | 1/1999 | Mack | 156/201 |
| 5,900,086 A | * | 5/1999 | Keller | 156/69 |
| 5,954,224 A | * | 9/1999 | Berger et al. | 220/666 |
| 6,174,393 B1 | * | 1/2001 | Scheifele | 156/69 |

FOREIGN PATENT DOCUMENTS

CA 571175 * 2/1959 .............. 264/259

* cited by examiner

Primary Examiner—Jan H. Silbaugh
Assistant Examiner—Stefan Staicovici
(74) Attorney, Agent, or Firm—Bachman & LaPointe, P.C.

(57) ABSTRACT

A process for the production of a multi-chamber packaging tube of plastic material, comprising a tube body portion with a tube head thereon, and at least one separating wall accommodated in the tube body portion and the tube head. To mount the tube head to the tube body portion by means of a tool including a die and a bar as respective tool halves, the bar is loaded with a separating wall and subsequently a tube body portion or vice-versa.

13 Claims, 6 Drawing Sheets

PROCESS FOR PRODUCING A MULTI-CHAMBER PACKAGING TUBE

The invention relates to a process for producing a multi-chamber packaging tube, more particularly a tube of plastic material.

BACKGROUND OF THE INVENTION

Multi-chamber packaging tubes are tubes with at least one partition or separating wall accommodated therein, to define a plurality of chambers for receiving respective packaging materials which are to be kept separate until they are delivered, for example components of a consumer material or item, which are to be brought together only when the item is to be used. Consumer items or materials of that kind are increasingly in the forefront in the field of technology, hygiene, cosmetics and pharmaceuticals.

There are various processes for the production of multi-chamber tubes, which in principle are distinguished as two kinds, more specifically assembler processes and forming processes. The main difference between these kinds of processes is that, in the assembler process, tubes with separating walls are assembled from individual parts while, in the forming process, a tube body portion with separating wall or a head with a separating wall, that is to say always at least two tube components, are formed in one working operation and then for example the tube body portion and the separating wall with head are brought together or the head and the separating wall with the tube body portion are brought together.

In one form of assembler process a prefabricated tube body portion is connected to a tube head which is also prefabricated. A separating wall which is of a fold-shaped configuration and which is resilient in its longitudinal and transverse directions is inserted into the tube body portion. The separating wall, more specifically at one of its transverse sides, is selectively connected to the tube head by adhesive, while the other transverse side is joined to the closure seam of the tube. Due to the transversely and/or longitudinally acting spring forces which are inherent in the separating wall, the separating wall is braced with its longitudinal sides against the interior of the tube body portion and, insofar as there is no adhesive join to the interior of the tube head, between the closure seam and the tube head.

In that process the separating wall is fitted into the interior of a prefabricated tube, and that is an operating procedure which can only be automated with difficulty. In addition special means have to be provided, for connecting the separating wall to the closure seam in a spring-biased condition, after filling of the chambers (U.S. Pat. No. 3,877,520 to Dukess).

In a further assembler process a separating wall is introduced into a prefabricated tube and is braced against the inside surface of the tube body portion along the longitudinal sides of the separating wall, by means of flaps. To form the flaps, the separating wall is spaced with respect to the longitudinal edges thereof, which act as hinges for the flaps. The bracing effect is effected by making use of the return force or memory of the plastic material or materials, to move the flaps in a direction towards the inside surface of the tube body portion. That process suffers from the disadvantage that the separating wall has to be introduced into the tube with the flaps in a condition of being bent over, and that results in complication of the loading apparatus which, by virtue of the mode of operation involved therewith, set limits on the output of the process in the sense of the number of assembled tubes per unit of time (U.S. Pat. No. 5,628,429 to Enamelon Inc.).

One kind of forming process is wherein firstly a head with a separating wall is formed and then the head produced in that way is joined to a tube body portion. A disadvantage of that process is generally the expense involved in automation thereof (British patent specification No 1 030 275 to Rosier).

Another forming process provides that a tube body portion with separating wall is formed by a winding operation around a mandrel or bar with longitudinal seam welds after the winding operation is concluded. A disadvantage of that process is that the winding operation does not make it possible to form any separating wall portions which could be brought into engagement with a shoulder and/or an outlet or nozzle of a tube head. That is obviated by virtue of the fact that prefabricated tube heads have the pitch relationships with which, when joining the tube head, separating walls are to be brought to bear against or otherwise connected to the "winding tube" (U.S. Pat. No 3,948,704 to The Proctor and Gamble Comp.).

The above-outlined assembler processes are generally implemented by starting from prefabricated tubes (head and tube body portion combined) while the basic starting point adopted in the forming process is a prefabricated tube body portion with head. The basic operation in both processes, namely producing a tube by forming a tube head on a tube body portion by press shaping or injection molding or by mounting a tube head to a tube body portion, using a finished head, have been developed to a high technical level which ensures a high level of output of tubes per unit of time. That output is markedly reduced by the process steps involved in the assembler and forming processes, and this factor lies in substantial separation of the latter procedure from the basic operation, that is to say the production of a tube from a tube body portion and a head.

SUMMARY OF THE INVENTION

An object of the present invention is to provide a process for producing multi-chamber tubes, which avoids the disadvantages of the assembler and forming processes as outlined above.

Another object of the invention is to provide a process for producing multi-chamber packaging tubes, which affords a simple reliable operating procedure with enhanced functional versatility and improved automation options.

Still a further object of the invention is to provide a process for the production of multi-chamber tubes, which combines process steps in a procedure attaining comparable production times to a process for producing single-chamber tubes.

In accordance with the principles of the invention the foregoing and other objects are attained by a process for the production of a multi-chamber packaging tube of plastic material, the tube comprising a tube body portion, a tube head and at least one separating wall which is accommodated in the tube body portion and the tube head. The tube head is mounted to the tube body portion by means of a tool including a die and a bar as tool halves. The bar is loaded with a separating wall and subsequently a tube body portion or vice-versa.

As will be seen from the description hereinafter of a preferred embodiment of the invention a process step which is common to the above-indicated prior tube-production processes—namely loading a bar or mandrel with a tube body portion—is supplemented by or preceded by an operation of loading a bar or mandrel with a prefabricated separating wall. The operation of loading the bar with a separating wall can be effected substantially more quickly than the operation, which is included in the assembler process, of introducing a separating wall into a tube or the operation, in the forming process, of joining a preshaped tube body portion to a head which is designed for example to extend a separating wall of the tube body portion into the head, whereby the process according to the invention, in regard to its output of multi-chamber tubes per unit of time, comes very close to the output of single-chamber tubes, so that the process according to the invention can provide for the production of a multi-chamber tube, with comparable economy to single-chamber tubes.

The procedure in accordance with the invention can be carried into effect as long as a female mold or die, referred to herein generally as the die, and a bar or mandrel, referred to herein generally as the bar, are determining technical means for carrying the process into effect. In the operation for forming the head on the tube, the die and the bar act as a mold for forming a head, insofar as liquid plastic material is injected under pressure into the mold (injection molding) or a given amount of plasticised plastic material, under the development of pressure, is shaped to form a head, by means of the bar (press shaping). As the bar in both cases carries the tube body portion and in accordance with the invention the separating wall, the tube body portion, in the procedure for forming the head, is joined to the latter, just as is the separating wall which projects into the head, unless precautions were taken not to join the separating wall to the head as it is being formed. In the operation for disposing the head on the tube, the die does not have a molding action in regard to the head, but acts as a means for receiving and holding a prefabricated head which substantially corresponds to its contour, and as a device for fusing the edge of the head and/or of an end of the tube body portion which is positioned on a bar, for connecting the two together. In this case also the die may locally limitedly cause melting of the head and/or the tube body portion with separating wall in such a way that the tube body portion and if desired the separating wall are connected to the head. Thus, in regard to the process according to the invention, the die is not limited in terms of its function to a shaping component of the process, but it also extends to a holding and heating function. The same applies for the bar which, in the forming process, acts as a holding and shaping element while in the mounting process it acts as a holding means solely for the tube body portion and the separating wall. In accordance with the invention, and with that background in mind, the die and the bar are functionally technical equivalents for the forming and mounting processes.

Irrespective of whether multi-chamber tubes are provided with finished heads or whether they have heads which are formed thereon, they can be of various configurations in regard to the arrangement of separating walls within the tube. In that respect, it is assumed that the transverse side of a separating wall corresponds to the internal contour of a head and is in engagement with that contour. Thus the separating wall may adjoin the inside surface, in which case the transverse side can also be so contoured that an extension acting as a wall engages through the outlet or nozzle opening of the head. With that separating wall configuration, the following arrangements of a separating wall in a tube are possible as alternative fixing modes and can be carried into effect with the process according to the invention:

a) a separating wall is connected neither to the head nor to the tube body portion. The separating wall is resiliently locked against the tube body portion;

b) connection of the transverse side of a separating wall to the head; the longitudinal sides of the separating wall remain unconnected to the inside surface of the tube body portion, but bear thereagainst in a prestressed or non-prestressed condition;

c) the transverse side of the separating wall remains bearing against the head but unconnected, the longitudinal sides are connected to the inside surface of the tube body portion; and d) the transverse side is connected to the tube head and the longitudinal sides are connected to the inside surface of the tube body portion.

The connection of the transverse side of a separating wall to the head can be made in various ways. When using injection molding the transverse side is molded or cast into place, while when press shaping is used the transverse side, that is to say a respective edge strip portion of the transverse side, is formed into the plasticised plastic material (PE) during the operation of forming the head. When a tube is provided with a prefabricated tube head, then the transverse side can be secured to the inside surface by the adoption of an adhesive join or a mechanical fixing, for example in the form of a groove which runs along the inside surface of the head and into which an edge portion of the transverse side can be inserted. If the separating wall is to remain unconnected to the head, means are to be provided, in the injection operation and the operation of forming the head on the tube body portion, which cover over the edge portions of the transverse side, with respect to the injected or plasticised plastic materials. Suitable means for that purpose could be plates or discs which cover over the front face of a bar with inserted separating wall, edge portions and cut edges. If the longitudinal sides of the separating walls remain unconnected to the inside surface, then they bear against the inside surface, applying pressure thereagainst. The pressure can be produced by virtue of the configuration of the separating wall, for example of a S-shaped cross-section and thus resiliently in the direction of opening of the S-shaped configuration or by virtue of return or restoration forces caused by a memory effect, for example produced by rounded flanges along the longitudinal sides of the separating walls which, like tubes, comprise plastic materials. The longitudinal sides can be connected to the inside surface of a tube body portion by adhesive means or welding, the latter with the application of heat and pressure. In that case the plastic material of the separating wall, that is to say for example of a flange which extends along the longitudinal side and possibly a strip which is disposed opposite the flange, along the inside surface of the tube body portion, is plasticised or melted and the flange and strip are pressed together.

Further objects, features and advantages of the invention will be apparent from the following description of a preferred embodiment of the invention.

DESCRIPTION OF THE PREFERRED EMBODIMENT

Figure 1:
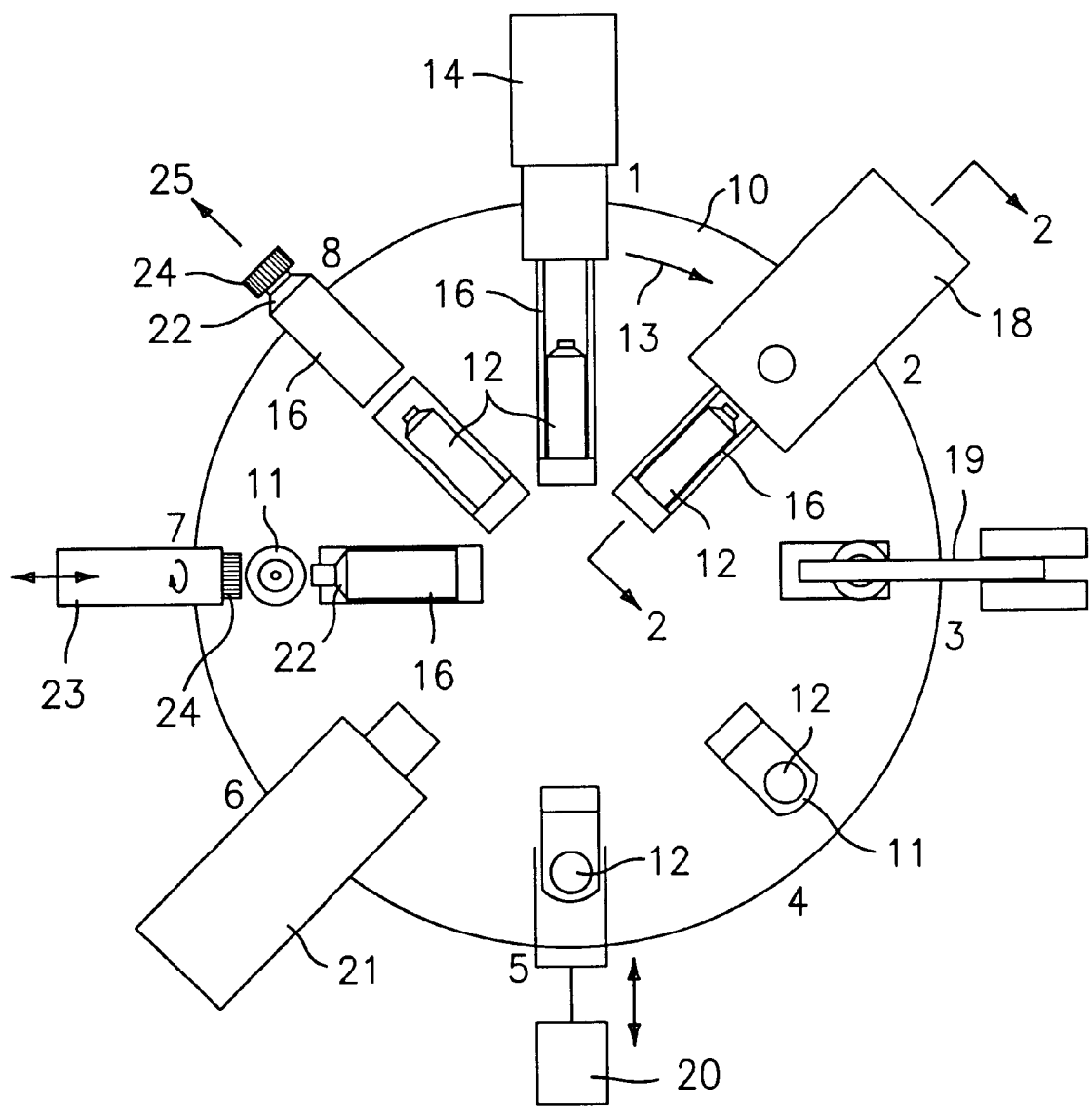
FIG. 1 is a plan view of a press shaping machine with tools arranged on a turntable, each passing through eight step positions.

Reference will now be made to the drawing to outline the steps of the process and to describe an embodiment of an apparatus for carrying out the process of the invention, followed then by a description of the preferred operating procedure of the process of the invention.

Looking firstly at FIG. 1 shown therein is a plan view of a rotary body which is in the form of a turntable 10. Female molds or dies 11 and bars or mandrels 12 are arranged on the turntable 10 at regular spacings in the peripheral direction, with a respective bar 12 being associated with each die 11. The dies 11 are open upwardly and the bars 12 are arranged on the turntable 10 pivotably from a horizontal position (see FIG. 3) through an angle of 90° into a vertical position (see FIG. 5) in which they are coaxial with the respective dies 11. In the coaxial position the bars 12 are axially displaceable in order to be able to close the associated die 11 and open it again. The digits 1 to 8 in FIG. 1 indicate for example eight step positions, wherein the turntable 10 is drivable by means (not shown) in the direction indicated by the arrow 13 through each respective step position.

The eight step positions, with each of which a respective station is associated, are described in detail hereinafter with further reference to FIGS. 2 through 5:

Station 1

Figure 2:
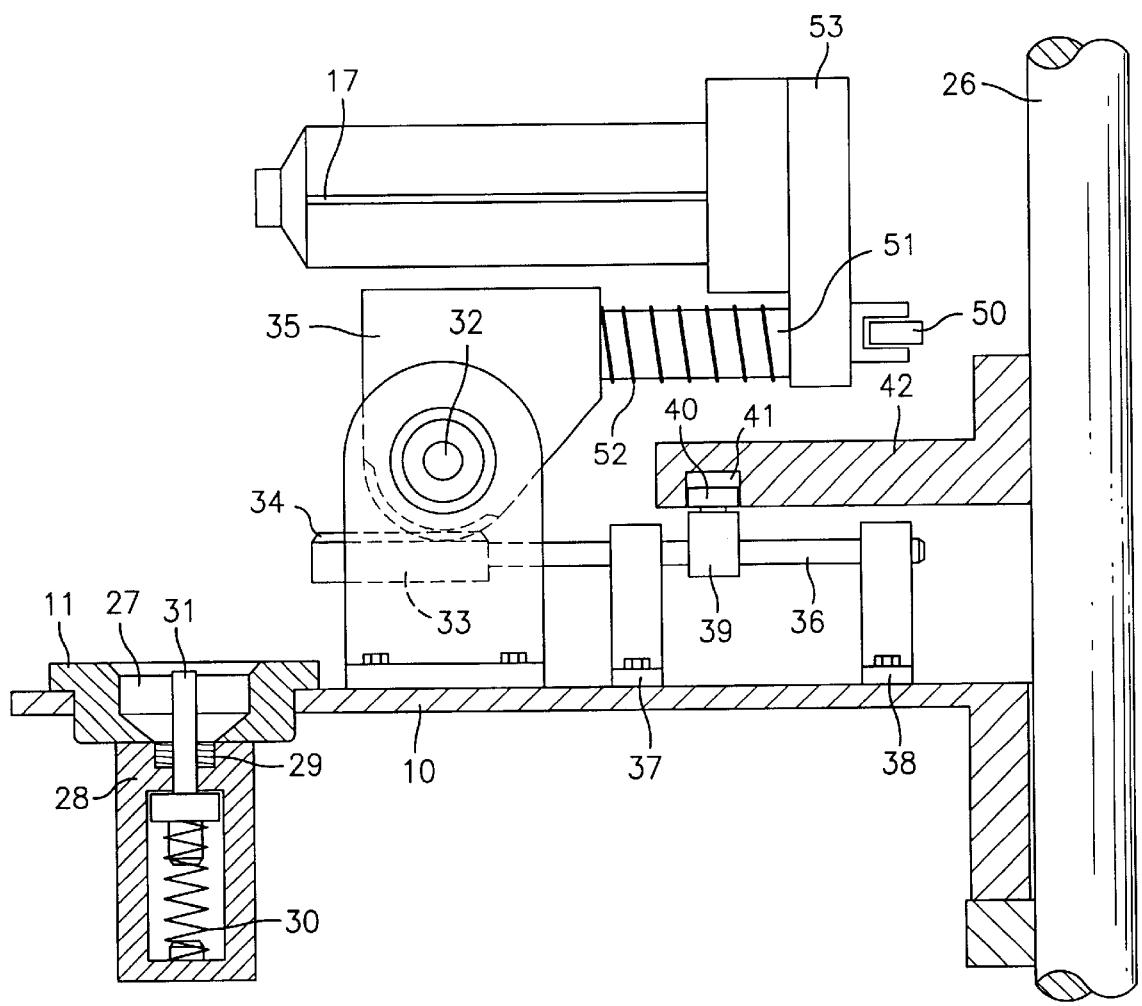
FIG. 2 shows the FIG. 1 turntable with one of the tools partly in section in step position 1 before loading of the bar of the tool with a tube body portion and a separating wall.
Figure 3:
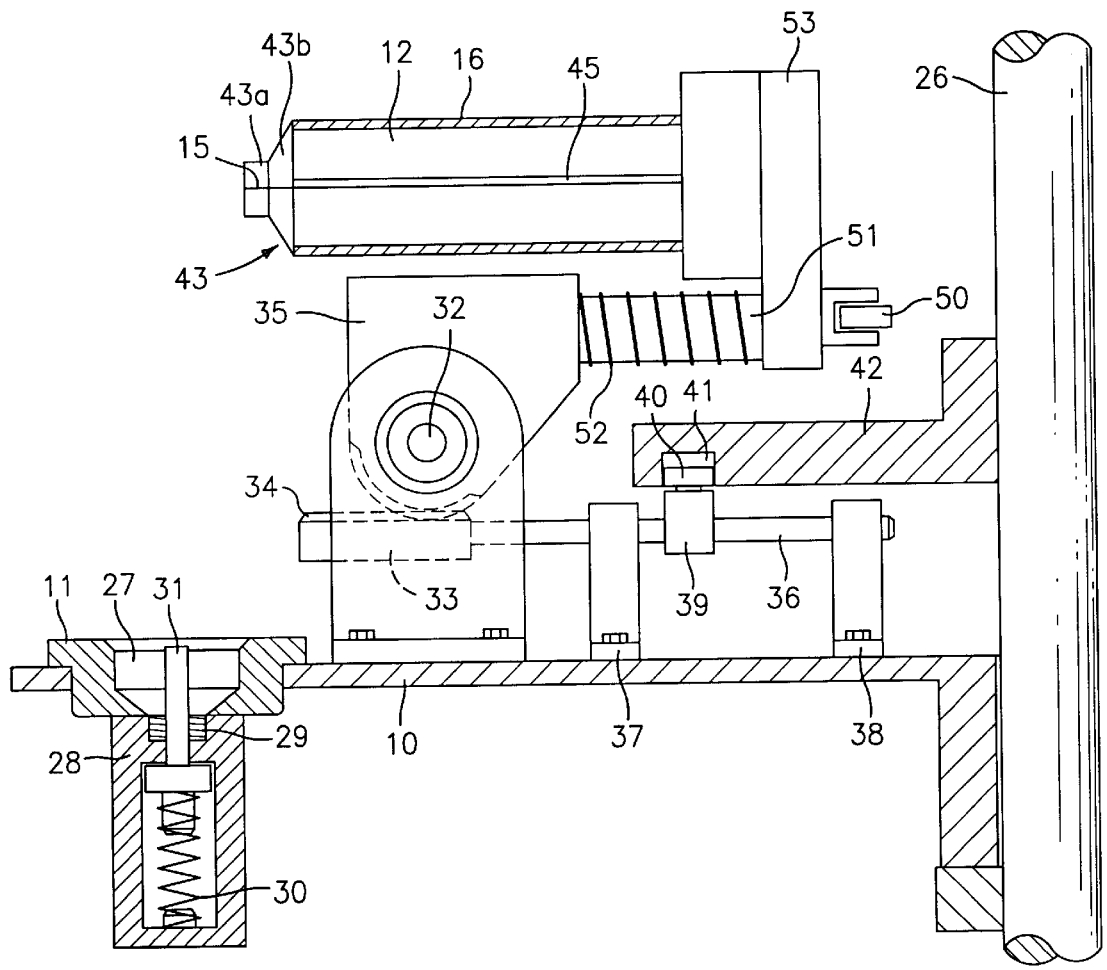
FIG. 3 shows the FIG. 1 turntable with one of the tools partly in section in step position 1 after loading of the bar of the tool with a tube body portion and a separating wall.

The bar 12 is firstly loaded as shown in FIG. 3 with a separating wall 15 and then with a prefabricated tube body portion 16, by a loading device 14. In that procedure, the separating wall 15 is accommodated in a slot indicated at 17 in FIG. 2 in the bar 12, flanges 45 of the separating wall 15 bearing in a shaped configuration against the bar 12 so that the tube body portion 16 can be pushed over the bar 12 and the flanges 45, moving over the latter in closely contacting relationship. Closely contacting relationship means a spacing between the flange 45 and the inside surface of the bar of between 0.05 mm and 1.0 mm, preferably between 0.4 mm and 0.8 mm. In the loading operation the bar 12 is disposed in a horizontal position so that loading is effected in a horizontal direction.

Station 2

Associated with the station 2 is a stationary material delivery unit 18. A portion (not shown) of plasticised plastic material is introduced in a condition of free fall by the material delivery unit 18 into the upwardly open die 11 which is covered over by the material delivery unit 18. Another method of loading can provide that the portion of material is put onto a material carrier which passes through the die in its longitudinal direction, that is to say perpendicularly, and which moves the portion of material into the position intended for same in the die. That position and an illustration of the die 11 is shown in station 7. When the assembly moves from station 2 to station 3 the bar 12 is pivoted into the vertical position in which it is coaxial with respect to the die, as in FIG. 5.

Station 3

The bar 12 is moved into the die 11 in the position in which it is coaxial with respect to the die 11, by means of an elbow lever as at 19 in FIG. 1, which is associated with the station 3, or by means of another suitable locking means 19, in order to press the portion of material which has been introduced into the die 11 in station 2 to form a tube head body, wherein the tube head body is fused to the tube body portion 16 and the separating wall 15 at the contoured transverse side is fused to the interior of the tube head and in the region in which the tube body portion 16 is fused to the tube head, it is also fused to the interior of the tube body 16. The bar 12 is held in that pressing position by means (not shown) in order to remain therein when the elbow lever 19 is retracted again.

Station 4

The bar 12 remains in the pressing position so that the pressed tube head with tube body portion 16 fused thereto and the separating wall 15 fused to the head can cool down and harden. For that purpose the die 11 and the bar 12 are cooled by a coolant by way of connections (not shown).

Station 5

The bar 12 still remains in the pressing position for the cooling operation. Preferably, an inductively acting welding device 20 can be integrated into the station 5. The welding device 20 connects, that is to say welds, the flanges 45 near the longitudinal edges of the separating wall 15 (longitudinal sides) to the inside surface of the tube body portion.

The welding operation is effected by fusing the material, that is to say the plastic material, near the longitudinal edges and a strip-shaped zone which is disposed opposite thereto and which extends in the longitudinal direction of the tube body portion 16, and preferably bringing them into engagement under pressure, that is to say, pressing them against each other. As can be seen from FIG. 1, the welding device 20 is not arranged on the turntable 10 but, like the loading device 14, arranged peripherally separately in relation thereto. To effect a welding operation the welding device 20 advances horizontally in the direction indicated by the arrow in FIG. 1 and thus moves heating and pressing units into the working position.

Station 6

The bar 12 is retracted from the die 11 in the axial direction by a retraction device 21 and thus the pressing tool comprising the die 11 and the bar 12 is opened again, after the die portion 28 for shaping a screwthread on the tube head had released the shaped screwthread by means (not shown), this being effected for example by moving mold jaws away from each other. When the assembly further moves from station 6 into station 7, the bar 12 with the head formed on the tube body portion 16 and the separating wall 15 connected thereto is moved back into the horizontal position.

Station 7

A closure 24 when for example in the form of screw cap 24, is screwed onto the tube head 22 by a screwing-on device 23 associated with the station 7, or, when the closure is for example in the form of a push-on cap, it is pushed onto the tube head 22.

Station 8

The tube comprising the tube body portion 16, the separating wall 15, the tube head 22 and the cap 24 is now finished and is ejected in the direction indicated by the arrow 25 in FIG. 1 or is pulled off the bar 12 by a suitable device (not shown). After the next following step in the cycle, the bar 12 is loaded again with a separating wall 15 and a tube body portion 16 to start the procedure again.

In the above-described apparatus as shown in FIG. 1, the process which is carried into effect therewith includes eight process steps implemented in the respective stations of the apparatus, referred to as process or cycle steps 1 to 8, wherein process step 7 involving applying a cap 24 to the tube head 22 is not absolutely necessary for carrying out the process according to the invention. Although the present embodiment involves eight stations in which the above-mentioned eight process steps are carried into effect, it is also possible for the eight process steps to be distributed among a different number of stations, being fewer than eight or greater than eight, for example ten stations. Thus, it would be possible to arrange between the stations 8 and 1 a further station with a loading device which only loads the station 12 with the separating wall 15, prior to the operation of loading it with the tube body portion 16. It would also be possible to provide a further station between the stations 3 and 4, or 4 and 5, or 5 and 6, at which the operation of welding along the separating wall could be effected by means of a welding device. In other words, all combined process steps described with reference to FIG. 1 (station 1, loading of the bar 12 with separating wall 15 and subsequently with tube body portion 16; station 5, cooling of the head 22 formed on the tube with simultaneous longitudinal edge welding) can be effected individually, with suitable adaptation of the number of stations. It would however also be possible to provide fewer than eight stations if functions for production of a multi-chamber tube are combined together.

FIG. 2 shows the turntable 10 with one of the tools partly in section in step position 1, that is to say at station 1 prior to loading of the horizontally extending bar 12 with a separating wall 15 and subsequently a tube body portion 16. Reference 26 denotes a vertical fixed shaft about which the turntable 10 is rotatably mounted and drivable stepwise by means (not shown). The die 11 which has the mold cavity 27 is let into and fixed in the turntable 10. The mold cavity 27 corresponds to the external boundary contour of the tube head 22 (FIG. 1). Disposed beneath the die 11 and coaxially with respect thereto is a further die portion 28 in which a further mold cavity 29 is arranged for forming a screwthread on the tube head 22. A punch or plunger 31 which is loaded in the axial direction by a spring 30 is axially displaceably mounted in the further die portion 28. The punch 31 is loaded by the spring 30 in the direction of the mold cavity 27 and is pushed back against the force of the spring 30, when the bar 12 is introduced into the die 11. The punch 31 serves to keep open the tube opening in the operation of pressing the tube head 22. The die portion 28 is rotatable about a further axis in order to be able to release the screwthread of the tube head when it is in the finished pressed condition. For that purpose it is rotated by means (not shown) or, in place of a rotary movement, it is opened by other means (not shown).

The bar 12 is arranged pivotably about an axis 32. The pivotal movement is produced by a pivoting device which for example includes a toothed rack 33 which engages with its teeth 34 into the tooth arrangement on a pivoting member 35. The rack 33 is connected to a push rod 36 which is axially slidably mounted in two mounting brackets 37, 38 which are fixed on the turntable 10. Between the mounting brackets 37, 38, the push rod 36 is rigidly connected to an entrainment member 39 having a guide roller 40 which is guided in a guide groove 41 of a cam disc 42 which is stationary, like the shaft 26. The guide groove 41 is of such a configuration that the entrainment member 39 reciprocates between the mounting brackets 37, 38, whereby the bar 11 is pivoted by way of the described means into a vertical position or a horizontal position.

Referring now to FIG. 3, at its front free end 43, the bar 12 shown therein is of such a configuration that the free end 43, at the end face of the bar, can form the inside contour of a tube head 22. In that case the projection portion 43a forms the through-flow opening of the outlet or nozzle of the tube head 22 while the inclined portion 43b adjoining same forms the inside surface of the shoulder of the tube head 22.

To receive a separating wall 15 a slot 17 extends in the axial direction through the bar 12, more specifically from the front free end face of the portion 43a over a distance which corresponds to the length of a separating wall 15. The separating wall 15 is inserted into the slot 17 by the loading device 14.

Figure 6:
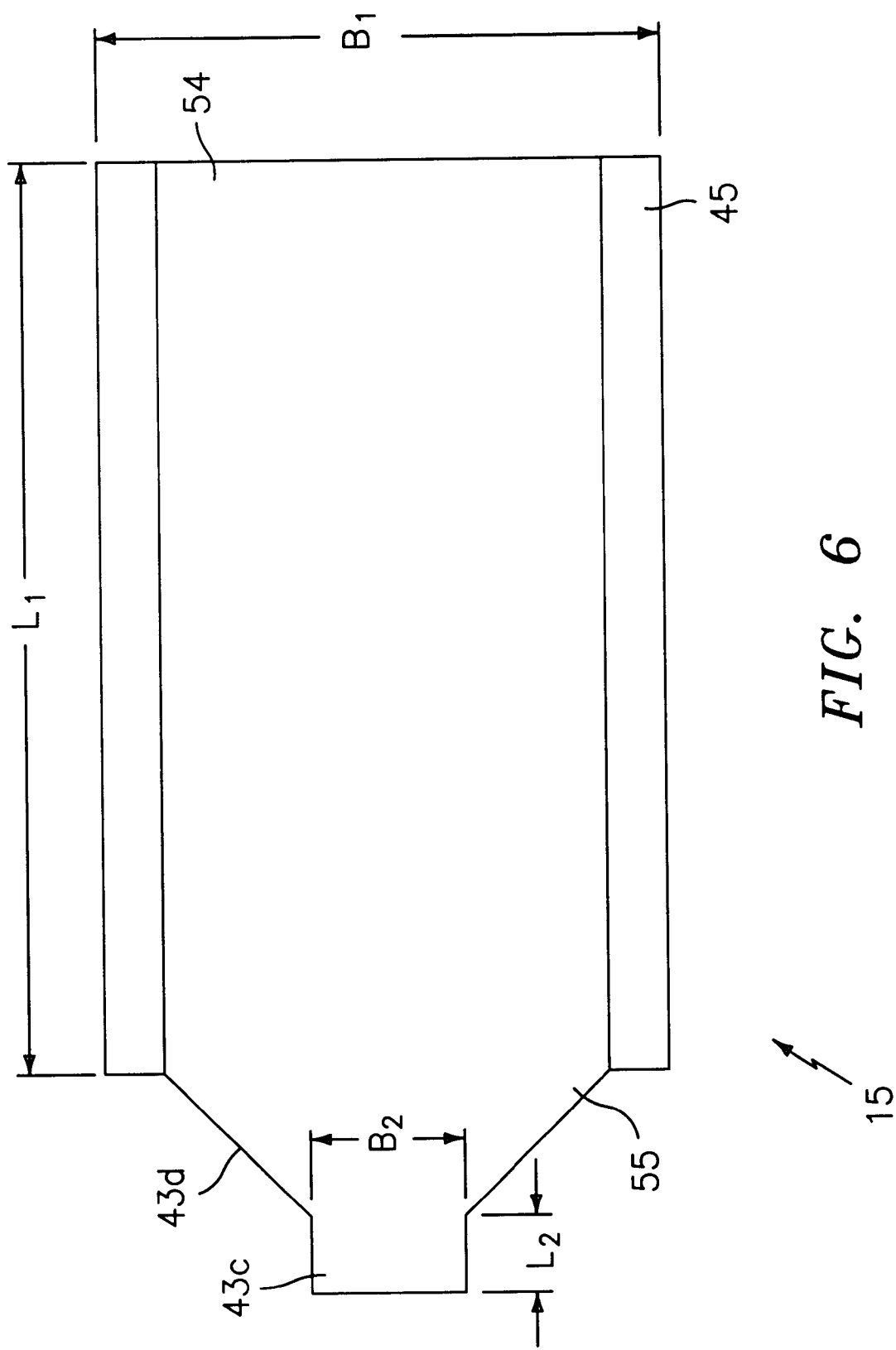
FIG. 6 is a plan view of a separating wall.

FIG. 3 shows the turntable 10 with one of the tools partly in section in step position 1, that is to say still in station 1 but in contrast to FIG. 2 after loading of the bar 12, which is still disposed horizontally, with a separating wall 15 and a tube body portion 16. The blank as shown in FIG. 6 of a separating wall 15 is preferably of such a configuration that at one end it corresponds in its external shape to the front free end 43 of the bar 12, in regard to the contouring of the transverse side, and adjoining same it corresponds in respect of its width at least to half the periphery of the bar while in respect of its length it corresponds to the length of a tube, preferably starting from the front free end of the portion 43a, the projecting portion at both sides on the separating wall being applied against the bar. In that way the separating wall 15 is accommodated entirely in the bar 12 and, in regard to the above-mentioned projecting portions, in a configuration involving the same contour as the surface of the bar 12. The identical contouring and dimensioning of the head part of the separating wall 15 and the accommodation thereof in the bar 12 is sufficient for the outer edges of the front end of the separating wall 15 (head part) to fuse to the inside surface of the outlet or nozzle opening and the inside surface of the shoulder of the head 22, when forming the head 22. Equally, the dimensioning of the longitudinal sides of the separating wall 15, which adjoin the front free end of the separating wall 15 (transverse side), is sufficient to connect to the inside surface of the tube body portion 16, more specifically in such a way that, when the tube is pressed flat, the separating wall 15 approximately corresponds to the width of the tube. The flanges 45 are therefore welded in place in such a way that each flange 45 forms for the separating wall 15 a spare surface or compensating surface in order to satisfy the increased need for separating wall area, when the tube is pressed flat.

With reference to FIG. 6 the projecting portions of the separating wall 15 are identified in the form of flanges 45 which permit longitudinal seam welding in a strip shape. Those flanges are bent over on both sides of the separating wall 15, in accordance with the diameter of the bar 12, they bear against the inside surface of the tube body portion 16 and they are each of a width formed from half the difference between half the circumference of the tube and the diameter of the bar, preferably increased by between 5% and 25%, preferably between 8% and 12% of the width.

In FIG. 3, the same parts as in FIG. 2 are identified by the same reference numerals.

Figure 4:
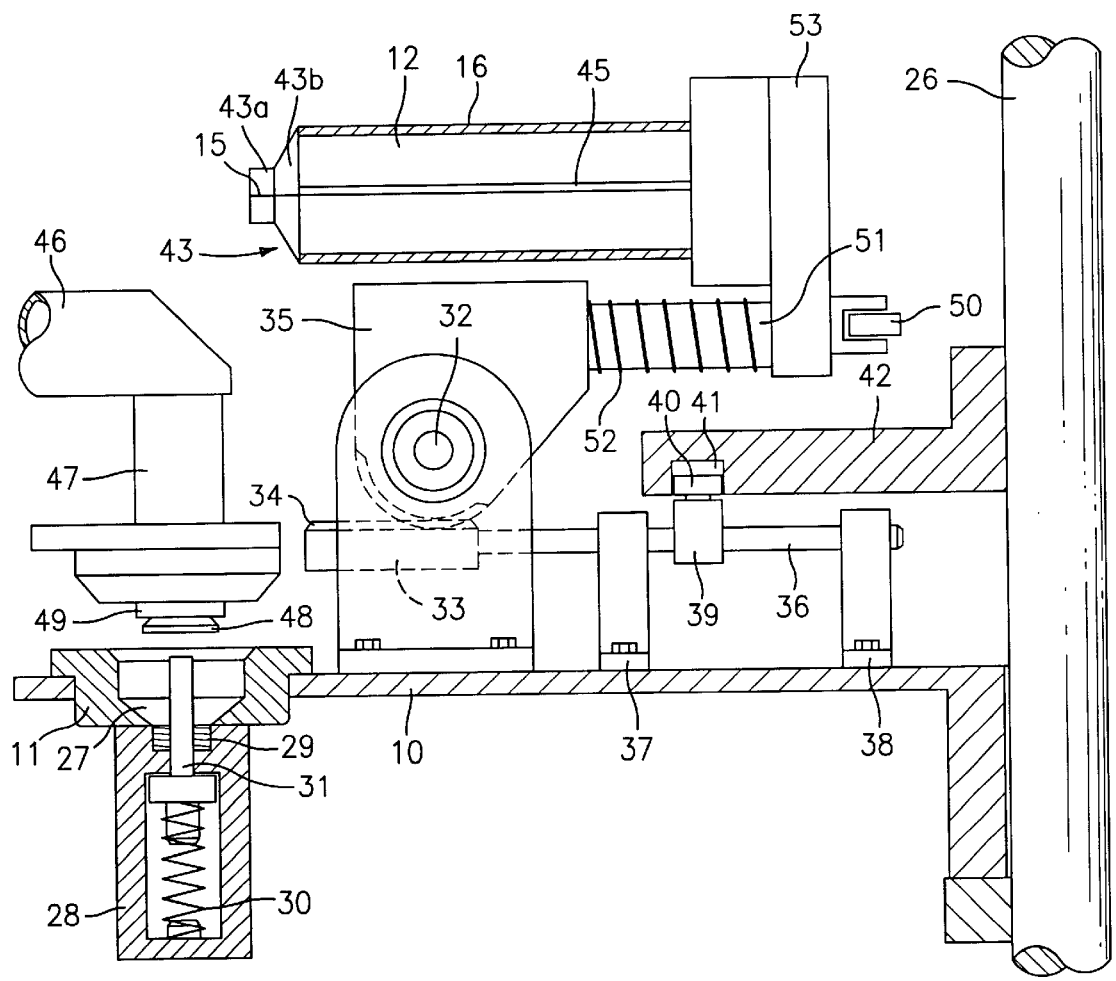
FIG. 4 shows the FIG. 1 turntable with one of the tools partly in section in step position 2 with loaded bar and upwardly open die beneath a filling device such as an extruder.

FIG. 4 shows the turntable 10 with one of the tools partly in section in step position 2, that is to say at station 2 with loaded horizontally disposed bar 12 and upwardly open die 11 beneath an extruder 46 as the filling device. The extruder 46 is stationarily associated with the station 2. It has a tubular portion 47 in which there is a closing member 48. The closing member 48 is in the form of a valve cone member and is arranged displaceably in the axial direction by means (not shown) for opening and closing same. The tubular portion 47 is surrounded by an annular nozzle 49 which is intended to produce a gas flow. For filling the die 11, the extruder 46 extrudes a portion (not shown) of plasticised plastic material.

The flow of plastic material which flows to the closing member 48 from the tubular portion 47 is shaped by the closing member 48 into the form of a ring, that is to say an annular portion of material of round to lense-shaped cross-section. The portion of material is separated from the extruder by closure of the closing member 48, and drops in a condition of free fall into the mold cavity of the die or onto a mold plate (not shown) for introducing the portion of material. A gas flow can be applied to the portion of material by means of the annular nozzle 49; the gas flow can promote separation of the portion of material from the extruder 46, when the closing member 48 has moved into the closed position. That loading procedure has been found to be advantageous as, after filling of the die 11 and prior to starting the pressing operation, that loading procedure makes it possible to avoid locally limited crystallisation of the plasticised plastic material, which otherwise can result in defects in the shaped head 12, the molded connection between the tube body portion 16 and the head 22, or the join between the separating wall 15 and the head 22.

In other respects, in FIG. 4 the same components as those which appear in FIGS. 2 and 3 are denoted by the same reference numerals.

Figure 5:
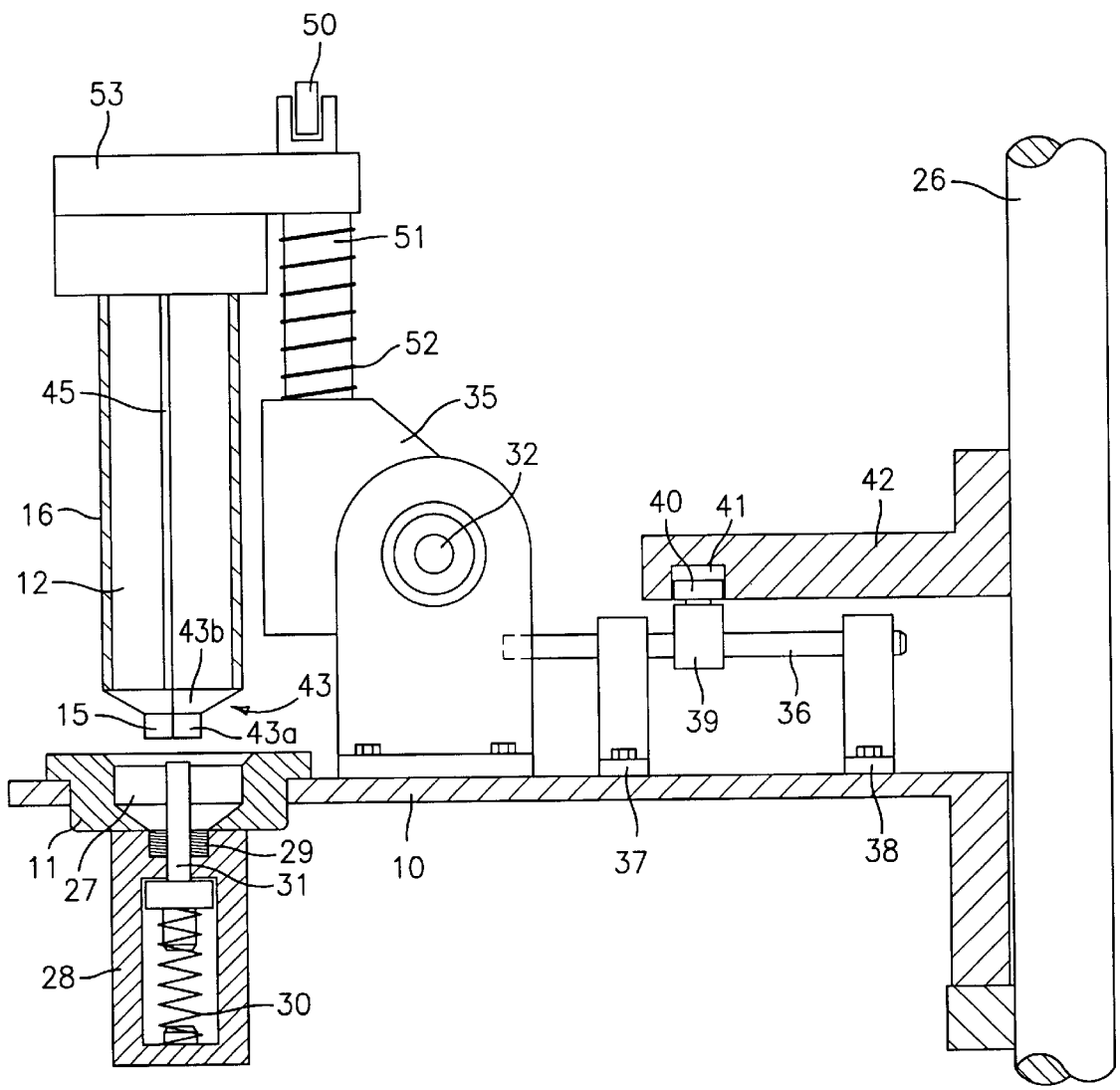
FIG. 5 shows the FIG. 1 turntable with one of the tools partly in section in step position 3 with the bar pivoted through 90° relative to the horizontal before being introduced into the upwardly open die which is filled with a portion of material (not shown)

FIG. 5 shows the turntable 10 with one of the tools partly in section in step position 3, that is to say at station 3. The loaded bar 12 has been pivoted through 90° relative to the horizontal and in that vertical position is oriented for engagement into the filled die 11. The movement of engagement of the bar 12 into the die 11 is implemented by an elbow lever 19 indicated also at station 3 in FIG. 1, which presses onto a roller 50 of a shaft 51 axially guided in the pivoting member 35, and displaces the shaft 31 in the pivoting member 35 towards the die 11 against the force of the spring 52. The bar 12 is arranged on the shaft 51 by means of a bar carrier 53 so that, upon displacement of the shaft 51, the loaded bar 12 moves into the die 11, effecting the pressing operation.

In FIG. 5 also, the same parts as in FIGS. 2, 3 and 4 are denoted by the same references.

FIG. 6 is a plan view of a blank of a separating wall 15. The separating wall 15 includes a substantially rectangular first portion 54 which, in regard to its width B1, in the case of a two-chamber tube of the same chamber dimensions, substantially corresponds to the diameter of a tube plus that of the projecting portions (flanges 45) while, in regard to its length L1, it substantially corresponds to the length of the tube body portion 16. Adjoining that portion 54 at one end is a second portion 55 which, in regard to its shape, substantially corresponds to the internal shape of a tube head. Thus, the projection portion 43c corresponds to the size of the projection portion 43a and the inclined edge 43d corresponds to the inclined portion 43b. The portions 43a and 43b are shaping surfaces of the front free end 43 of the bar 12 (FIG. 3). The length L2 of the portion 43c substantially corresponds to the length of a nozzle or outlet opening while the width B2 corresponds to the diameter thereof. When inserted into the slot 17 in a bar 12, the side of the separating wall 15, which is opposite to the portion 55, bears against the end of the slot 17 while the flanges 45 of the separating wall 15 bear substantially against the surface of the bar 12, by being shaped to lie thereagainst.

With an increase in width, by virtue of the provision of flanges 45, by the above-indicated values, and with the provision of the welded seams near the longitudinal edges thereof, it is possible to form, between the flange 45 and the interior of the tube body portion 16, welded seams which are wider and which are thus capable of carrying a heavier loading, than would be possible when welding flanges which are not increased in width, with the same position for the welded seam. For the purposes of fitting into a tube, that is to say into a tube body portion 16, the flanges 45 are preferably bent over in a direction of rotation along the longitudinal edges of the portion 54 in such a way that, when the separating wall 15 is pushed into the slot 17 in the bar 12, the flanges bear against the outside surface of the bar 12 so that the tube body portion 16, passing over the flanges 45, can be fitted onto the bar 12. While the separating wall 15 is accommodated in the bar 12, the flanges 45 are disposed between the outside surface of the bar 12 and the inside surface of the tube body portion 16. It is intended for example that the welding operation is to be effected at a cooling station for the head 22 with the second portion 55 fused thereto, as in station 5. The welding operation is effected by the inductively generated development of heat and by fusing the tube body portion 16 and the flange material 45 together in strip form, with the strips being pressed at the same time or subsequently. For that purpose, in welding arrangements, the heating devices are combined with pressing devices or pressing devices are arranged downstream of heating devices, while cooling devices can be subsequently disposed, for example involving blowing air against the seams. If for example upon being heated the flanges 45 develop a certain return or memory force, that is to say of their own accord they press against the inside surface of the tube body portion 16, that may make it possible to eliminate the pressing operation using a separate tool, for the purposes of producing a welded seam. By virtue of the fact that the flanges 45 are bent over to bear against the bar 12 in the clockwise direction or in the counter-clockwise direction, as a result of their widthwise dimension and as a result of the intended position for the welded seams (near the longitudinal edges of the flanges), the welded seams, once again in the direction in which the flanges are bent over, are disposed at both sides at an angle with respect to the slot 17 for receiving the separating wall 15, or with respect to the longitudinal axis of the bar 12.

For operational reliability of tubes, it has been found advantageous if the angles on the two sides are of equal magnitude with a deviation of at most between 0.5 degree and 1.5 degree, preferably 0.6 and 0.9 degree.

Materials that can be used for making the tube body portions are plastic monofoils or monosheets, consisting of a single layer of a plastic material, plastic laminate foils or sheets, comprising at least two plastic layers or metal laminate foils comprising metal foil lined on both sides with one or more plastic foils. In the case of plastic and metal laminate foils the outer layers generally consist of polyethylene which can be satisfactorily welded together. Polyethylene is also suitable for forming the head 22 on an end of the tube body portion 16 as polyethylene is equally suitable for injection molding and press shaping. When choosing the material for the tube body portion, attention is to be directed to its resistance to diffusion when used for higher-value packaging materials. To satisfy that requirement, the head can be covered with a barrier layer on its outside and/or on its inside. Preferably the separating wall 15 comprises a plastic material which can be welded well to the plastic material of the inside surface of the tube body portion 16. If for example the inside surface of the tube body portion 16 comprises polyethylene, it is advantageous if the separating wall also comprises a polyethylene foil. If diffusion of particular packaging components from one tube chamber into the other is to be prevented, the separating wall can also comprise a diffusion-resistant material, for example a metal laminate. Preferably, for such purposes, metal laminates of a thickness of between 250 μ and 350 μ, preferably between 290 μ and 310 μ, are used.

The structure of the apparatus having been described hereinbefore, the mode of operation of the process according to the invention, involving forming the head on the tube by press shaping, for production of a multi-chamber tube, will now be set forth.

In station 1 the loading device 14 firstly loads the bar 12 with a separating wall 15 and then with a tube body portion 16, or vice-versa. In the loading operation, the separating wall 15 is introduced into the slot 17 in the bar 12, whereupon the tube body portion 16 is pushed over the bar 12.

After the loading operation has been effected the die 11 of the tool is filled in station 2 with an amount of plasticised plastic material, that corresponds to the amount of material necessary to form the tube head 22.

In station 3, the pressing operation for forming the head 22 is effected by introducing the bar 12 into the die 11, and at the same time a front end of the tube body portion 16 is fused to the outer periphery of the head 12 and the portion 55, more specifically the end of the separating wall 15, that is to say the edge portion, which projects into the interior of the head, is fused to the interior of the tube head 22. With that step, not only the shoulder space or chamber of the head but also the outlet opening of the nozzle of the head 22 are divided by means of a wall member. After the press shaping operation, the head with the end of the separating wall fused thereto (at the portion 55) is cooled down. The cooling operation can take place over a plurality of stations. The cooling time is used to weld the separating wall 15, for example by means of the flanges 45, in the longitudinal direction, to the inner periphery of the tube body portion 16.

In principle, in this respect the process according to the invention aims at:

1) combining the operations of loading the bar 12 with the separating wall 15 and the tube body portion 16; and, as a subsidiary aspect, 2) using cooling times for the operation of longitudinal welding of the separating wall 15 to the tube body 16, so that the entire production time for a multi-chamber tube is not lengthened in comparison with a single-chamber tube.

After cooling and welding have been effected for example in station 5, the tool is raised in following station 6 and the bar 12 with the tube carried thereon is moved into a position such that a closure cap 24 can be fitted onto the head 22 of the tube for example by means of a screwing-on device 23, for example in a station 7.

Thereafter, in station 8, the tube is removed from the bar 12 and then the tool moves back into station 1, that is to say into the initial station, for loading the bar 12.

The process according to the invention has been described by way of example in conjunction with the above-described apparatus. It will be appreciated, however, execution of the process according to the invention is not limited to that apparatus but in principle, any apparatus suitable for carrying out the process according to the invention can be employed, as long as the claimed process steps can be carried into effect therewith.

If the aim is to produce a product in the form of a tube with a separating wall whose longitudinal sides are not connected to the inside surface, then, in the above-described apparatus, the operating procedure of the process according to the invention can be suitably modified, with the process steps being otherwise the same, by rendering inoperative the welding device 20 at station 5. If there is a wish only for longitudinal side welding, without the separating wall being welded to the inside surface of the head, then in station 1 the operation of loading the bar 12 with the separating wall and the tube body portion can be supplemented by the inclusion of a plate or disc (not shown) which covers over the front free end 43 of the bar 12 so that injected plastic material or the portion of plasticised plastic material is prevented from flowing around the corresponding edges of the separating wall at station 2. Otherwise, with this second form of partial welding, in which the longitudinal sides are only joined to the inside surface of the tube body portion, the process can be carried into effect in the same way as in the case of full welding in which the separating wall is joined to the head and the inside surface of the tube body portion or the first form of partial welding in which the separating wall is only joined to the inside contour of the head.

If the apparatus and process according to the invention are implemented by means of the process step involving injection molding, then step 2 comprising charging the die with a portion of plasticised plastic material is rendered inoperative. Instead, in station 3, liquid plastic material is injected into a closed mold, with a female mold portion or die and a male mold portion each forming a respective mold half. Loading of the bar 12, full welding, first form of partial welding and second form of partial welding are effected as described in connection with the procedure for press shaping of the head. In the operation of fitting the head, the bar is loaded as already described in connection with the process for forming the head. In station 2, a prefabricated head is introduced into the die which in this case serves not as a shaping element but as a holding means or receiving means. At station 3 the bar 12 moves into the die. A heating device which is introduced into the die or possibly also into the male mold portion softens or liquefies the plastic material of an edge portion of the tube body portion and/or a peripheral edge portion, to such an extent that the latter flow one into the other, to join the head and tube body portion together. In principle it is possible for the transverse side of the separating wall to be joined to the interior of the head, by being fused onto same. However, a preferred join is formed by a mechanical join, that is to say introducing an edge portion of the transverse side of the separating wall into a groove on the inside of the head constituting a first form of partial join. In the case of a full join, transverse sides of the separating walls are mechanically joined to the heads, while the longitudinal sides are joined by welding using heat and pressure in station 5 to the inside surfaces of the tube body portions. In a second form of partial join, it is possible to eliminate the operation of inserting the transverse side of the separating wall, and it is possible to effect only the welding operation at the longitudinal sides in station 5.

It will be appreciated that the above-described process according to the invention, and the apparatus structure for carrying the process into effect, can be the subject of further modifications and alterations without thereby departing from the spirit and scope of the invention.

What is claimed is:

1. A process for the production of a multi-chamber packaging tube of plastic material, the tube comprising a tube body portion, a tube head and at least one separating wall accommodated in the tube body portion and the tube head, wherein the tube head is mounted to the tube body portion by means of a tool including a die and a bar as respective tool halves, the bar being loaded with at least one of the separating wall and the tube body portion and thereafter the other of the separating wall and the tube body portion and thereafter mounting the tube head onto the tube body portion.

2. A process as set forth in claim 1 wherein the bar is sequentially loaded with the separating wall and thereafter the tube body portion.

3. A process as set forth in claim 1 wherein the bar is sequentially loaded with the tube body portion and thereafter the separating wall.

4. A process as set forth in claim 1 wherein the head is produced by being formed on the tube.

5. A process as set forth in claim 4 wherein the operation of forming the head on the tube is effected by press shaping.

6. A process as set forth in claim 4 wherein the operation of forming the head on the tube is effected by injection molding.

7. A process as set forth in claim 1 wherein the tube head is mounted in the form of a prefabricated tube head on the tube body portion.

8. A process as set forth in claim 1 wherein the separating wall has a transverse side and the tube head has an inside surface, and wherein the transverse side of the separating wall is connected to the inside surface of the tube head.

9. A process as set forth in claim 1 wherein the separating wall has longitudinal sides and the tube body portion has an inside surface, and wherein the longitudinal sides of the separating wall are connected to the inside surface of the tube body portion.

10. A process as set forth in claim 1 wherein the separating wall has a transverse side and longitudinal sides, the tube head has an inside surface and the tube body portion has an inside surface, and wherein the transverse side and the longitudinal sides of the separating wall are connected to the inside surface of the tube head and the inside surface of the tube body portion respectively.

11. A process as set forth in claim 7 wherein the separating wall has a transverse side mechanically connected to the prefabricated tube head by engaging into a groove.

12. A process for the production of a multi-chamber packaging tube of plastic material, the tube comprising a tube body portion, a tube head and at least one separating wall accommodated in the tube body portion and the tube head, comprising loading the separating wall on to a bar constituting a male tool portion of a tool assembly for mounting the tube head to the tube body portion, then loading the tube body portion on to said bar, and mounting the tube head to the tube body portion by bringing together for operative co-operation the bar carrying the tube body portion and the separating wall and a tube head die as a female tool portion of said tool assembly for said tube head.

13. A process for the production of a multi-chamber packaging tube of plastic material, the tube comprising a tube body portion, a tube head and at least one separating wall accommodated in the tube body portion and the tube head, comprising loading the tube body portion on to a bar constituting a male tool portion of a tool assembly for mounting the tube head to the tube body portion, then loading the separating wall on to said bar, and mounting the tube head to the tube body portion by bringing together for operative co-operation the bar carrying the tube body portion and the separating wall and a tube head die as a female tool portion of said tool assembly for said tube head.

* * * * *